(12) United States Patent
Han et al.

(10) Patent No.: US 12,390,672 B2
(45) Date of Patent: Aug. 19, 2025

(54) RESPIRATOR

(71) Applicant: HONEYWELL SAFETY PRODUCTS USA, INC., Charlotte, NC (US)

(72) Inventors: Xiaojin Han, Charlotte, NC (US); Hongbing Xiang, Charlotte, NC (US); Licong Duan, Charlotte, NC (US); Wei Shi, Charlotte, NC (US); Hang Tian, Charlotte, NC (US)

( * ) Notice: Subject to any disclaimer, the term of this patent is extended or adjusted under 35 U.S.C. 154(b) by 685 days.

(21) Appl. No.: 17/650,016

(22) Filed: Feb. 4, 2022

(65) Prior Publication Data

US 2022/0249883 A1 Aug. 11, 2022

(30) Foreign Application Priority Data

Feb. 5, 2021 (CN) .................. 202110162854.X

(51) Int. Cl.
*A62B 23/02* (2006.01)
*A62B 18/02* (2006.01)
*B01D 46/00* (2022.01)

(52) U.S. Cl.
CPC .......... *A62B 23/02* (2013.01); *A62B 18/025* (2013.01); *B01D 46/0002* (2013.01)

(58) Field of Classification Search
CPC ..... A62B 23/02; A62B 23/025; A62B 18/025; A62B 18/02; A62B 18/08; A62B 7/10; B01D 46/4227; B01D 46/106
See application file for complete search history.

(56) References Cited

U.S. PATENT DOCUMENTS

| 4,997,217 A | 3/1991 | Kunze |
| 2006/0090754 A1 | 5/2006 | Mittelstadt et al. |
| 2009/0065006 A1* | 3/2009 | Patterson ............ A62B 18/025 128/205.27 |
| 2014/0116429 A1 | 5/2014 | Patil et al. |

FOREIGN PATENT DOCUMENTS

| CN | 204128080 U | 1/2015 |
| CN | 111803817 A | 10/2020 |

* cited by examiner

*Primary Examiner* — Kendra D Carter
*Assistant Examiner* — Maap Ellabib
(74) *Attorney, Agent, or Firm* — Fredrikson & Byron, P.A.

(57) ABSTRACT

The present invention provides a respirator. The respirator (100) has an outer housing (103), a filter, and an end cover (104). The filter is arranged on the outer housing (103). Position-limiting devices matching each other are respectively provided on the end cover (104) and the outer housing (103), and are used for fixing the filter at the outer housing (103).

9 Claims, 13 Drawing Sheets

101

102

RESPIRATOR

CROSS-REFERENCE TO RELATED APPLICATIONS

This application claims priority pursuant to 35 U.S.C. 119(a) to China Patent Application No. 202110162854.X, filed Feb. 5, 2021, which application is incorporated herein by reference in its entirety.

TECHNICAL FIELD

The present invention relates to a respirator, and in particular to a respirator having a position-limiting device.

BACKGROUND

Powered air purifying respirators (PAPRs) on the market have some disadvantages, and these disadvantages need to be eliminated from novel PAPR products.

Inappropriate seal design of a PAPR filter causes the filter to leak when the filter is worn. Hard contact with an edge seal of a flat filter medium often results in a poor sealing effect. Scientific and innovative sealing materials, structures, and design should be developed to achieve a good sealing effect.

User experience of current filter media is poor. The filter media cannot be easily mounted or removed. Novel structures that can be used easily should be developed to improve user experience.

All PAPR products on the market are provided with exhalation valve design to allow for comfortable breathing. However, this design cannot be used for protection against COVID-19, because this design can only protect a wearer from external harm, and cannot prevent an infected person from spreading virus to the outside.

A filtration area of an inhalation filter is small, so that inhalation resistance is high. Filter media on the market are typically treated in a flat mode. High resistance affects a service life (battery life) and wearing experience of a wearer.

CN 204128080 U relates to an air purifier, including a primary filter and a fan. An air outlet of the primary filter is connected to an inlet of the fan. An outlet of the fan is connected to an air pipe. The air pipe extends to a bottom portion of a box body containing a filter medium. An upper portion of the box body is an open air outlet structure. A negative ion generator is mounted at the open air outlet structure. The air purifier can continually suck in foul air. After undergoing primary filtration, filtration performed by a liquid filter medium, and treatment performed by negative ions, the foul air is changed into clean air. The air purifier has a composite air cleaning function, can remove 99.99% of PM2.5, kill harmful bacteria rapidly, decompose harmful gas in the air, and protect health of users, can be easily used, operates stably and reliably, and is applicable to air purification and filtration in offices, homes, and the like.

SUMMARY

An objective of the present invention is to provide a respirator having a position-limiting function.

Further, the present invention is intended to address or alleviate other technical problems present in the prior art.

The present invention addresses the aforementioned problems by providing a respirator. Specifically, according to an aspect of the present invention, the present invention provides: the respirator has an outer housing, a filter, and an end cover, the filter being arranged on the outer housing, wherein position-limiting devices matching each other are respectively provided on the end cover and the outer housing, and are used for fixing the filter at the outer housing.

Optionally, according to an embodiment of the present invention, the position-limiting device on the outer housing comprises a rod, the rod being fixed at the filter, a plurality of ribs being formed in a longitudinal direction of the rod and provided on an outer peripheral edge of the rod, the position-limiting devices on the end cover being recesses, and one end of the rib engaging with the recess.

Optionally, according to an embodiment of the present invention, the ribs are evenly distributed on the outer peripheral edge of the rod.

Optionally, according to an embodiment of the present invention, an opening is provided in a middle portion of the end cover, and the recesses are provided on the outer periphery of the opening.

Optionally, according to an embodiment of the present invention, a through hole is provided in the middle of the filter, and the rod passes through the through hole.

Optionally, according to an embodiment of the present invention, the respirator further has a threaded fastener having an unthreaded segment and a threaded segment, an aperture being provided in the middle of the rod, and the opening being provided with an inner thread, wherein the threaded fastener is inserted into the aperture by means of the unthreaded segment thereof, and engages with the inner thread by means of the threaded segment thereof.

Optionally, according to an embodiment of the present invention, the rod is configured to retain a filter medium of the filter.

Optionally, according to an embodiment of the present invention, the end cover is configured to be in the shape of a curved disc.

Optionally, according to an embodiment of the present invention, the filter is configured to be an inhalation filter.

Optionally, according to an embodiment of the present invention, the outer housing has a recessed portion that is recessed relative to an outside surface thereof, and the inhalation filter is accommodated in the recessed portion.

The provided respirator has the following benefits: improved user experience, low resistance to inhalation, the restricted positions of the filter and the end cover, no leakage, and no deformation on the filter.

BRIEF DESCRIPTION OF THE DRAWINGS

With reference to the accompanying drawings, the above and other features of the present invention will become apparent, wherein.

DETAILED DESCRIPTION OF THE EMBODIMENTS

Figure 1:
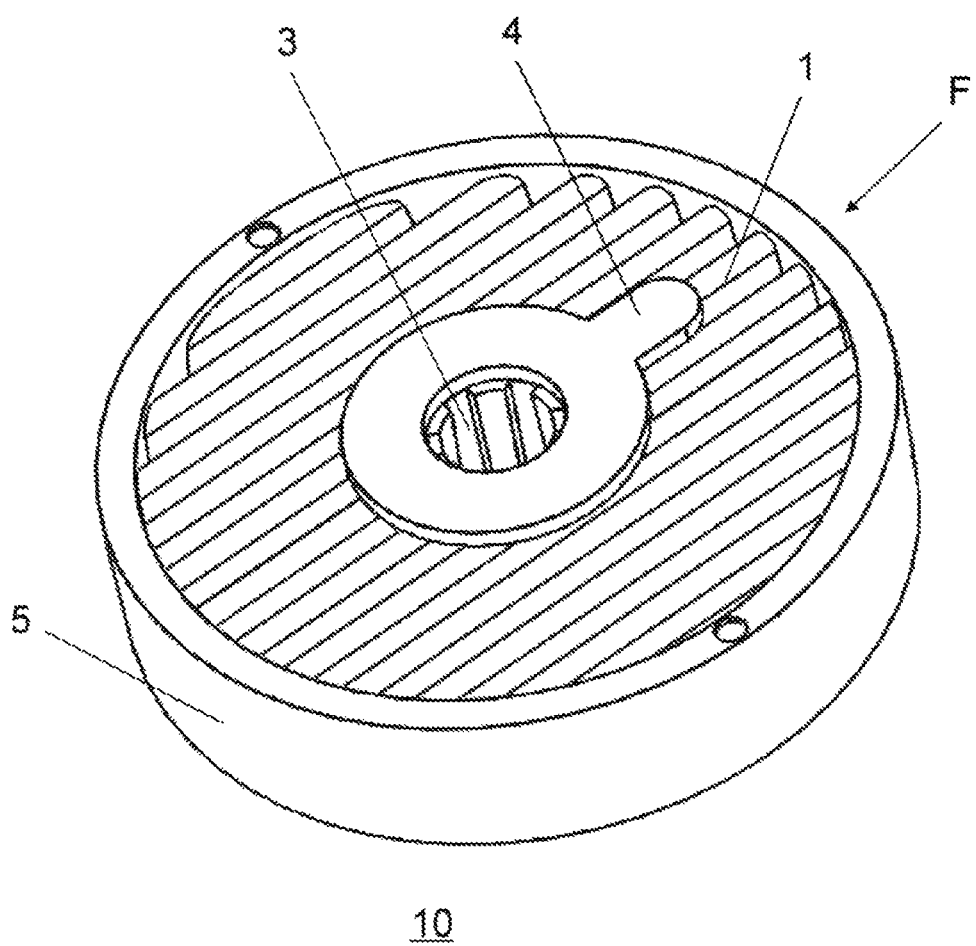
FIG. 1 shows a schematic diagram of an inhalation filter according to the present invention.

It will be readily appreciated that in accordance with the technical solution of the present invention, a person of ordinary skill in the art can propose a variety of structural ways and implementations that can be replaced with one another without changing the essence or spirit of the present invention. Therefore, the following detailed description and the accompanying drawings are merely exemplary illustrations of the technical solution of the present invention, and are not to be considered as the entirety of the present invention or as a limitation or confinement on the technical solution of the present invention.

The positional terms such as upper, lower, left, right, front, rear, front surface, back surface, top, bottom, etc. mentioned or possibly mentioned in the present specification are defined with respect to configurations shown in the accompanying drawings, are relative concepts, and thus may vary accordingly depending on different positions and different use statuses thereof. Therefore, these or other positional terms should not be interpreted as limiting terms. Further, the terms "first," "second," "third," etc., or similar expressions are used merely for description and differentiation, and are not to be construed as indicating or implying relative importance of respective members.

The present application relates to a filter. The filter is used in a respirator 100. The filter has a filter medium 1, and the filter medium 1 has a pleated structure.

According to an example of the present application, the pleated structure is shown as a parallel structure, a radial structure, or a concentric circular ring structure when viewed in a cross section parallel to a filtration surface F of the filter.

According to an example of the present application, the filter medium 1 is made of a HEPA material.

According to an example of the present application, the filter medium 1 is further made of an antibacterial and antiviral material and/or an activated carbon fabric material.

According to an example of the present application, the filter is configured to be an inhalation filter 10 and/or an exhalation filter 20.

According to an example of the present application, a ramp and/or step 2 is provided on a side wall of the filter.

According to an example of the present application, a handle 4 is provided on the filter.

According to an example of the present application, the filter has a housing 5 for accommodating the filter medium 1, and the housing is configured to be a cylinder or a cuboid.

According to an example of the present application, the cuboid has curved side surfaces.

The present application relates to a respirator 100. The respirator 100 has the filter according to the present application.

According to an example of the present application, the respirator 100 is configured to be an electric supplied-air respirator or a face mask.

According to an example of the present application, the respirator 100 has a facepiece, and one or more inhalation filters 10 including the filter are arranged at the facepiece.

According to an example of the present application, the respirator 100 has a facepiece provided with one or more exhalation filters 20 including the filter.

According to an example of the present application, the respirator 100 has a facepiece provided with one exhalation filter 20 including the filter and two inhalation filters 10 including the filter. The exhalation filter 20 is arranged in the middle of a lower portion of the facepiece at the mouth position of a user, and the inhalation filters 10 are arranged on two sides of the facepiece and above the exhalation filter 20 in a vertical direction.

The present application relates to a method for manufacturing a filter. The filter is configured to be the filter according to the present application. The method includes the following steps of:

pleating the filter medium 1 to form the pleated structure;
shaping the pleated filter medium 1; and
forming the housing 5 of the filter on the shaped filter medium 1 so as to accommodate the filter medium 1.

According to an example of the present application, if the pleated structure is shown as a parallel structure when viewed in a cross section parallel to the filtration surface F of the filter and the filter is configured to be a cylinder, then formation of the housing 5 is performed by forming the housing 5 in the shape of an ellipse around the shaped filter medium 1. A major axis direction of the ellipse is perpendicular to an extension direction of the parallel structure, and a minor axis direction of the ellipse is consistent with the extension direction of the parallel structure.

The present application relates to a respirator 100. The respirator 100 has an outer housing 103, a middle frame 101, and a facial seal 108. The facial seal 108 is connected to the middle frame 101, and is fit to and forms a seal to the face of a user when the respirator 100 is in use. The respirator 100 further has an integrated board 102. The integrated board 102 is arranged between the outer housing 103 and the middle frame 101, and is provided with a functional member 107 for the respirator 100.

According to an example of the present application,
the middle frame 101 is formed by TPU; and/or
the facial seal 108 is formed by silicone; and/or
the integrated board 102 is formed by PA, PP, or ABS.

According to an example of the present application, a connection between the integrated board 102 and the middle frame 101 is a tight connection, and the middle frame 101 is connected to the outer housing 103.

According to an example of the present application, the middle frame 101 is configured to be a frame provided with an accommodation portion in the middle. The integrated board 102 is inserted in the accommodation portion. An erect edge frame is provided at a peripheral edge of the integrated board 102. The shape of the edge frame of the integrated board 102 matches the shape of an edge of the accommodation portion of the middle frame 101.

According to an example of the present application, the integrated board 102 is bonded to the middle frame 101 by means of a glue.

According to an example of the present application, the functional member 107 includes a blower fan, a battery, and/or a PCB for the respirator 100.

According to an example of the present application, the respirator 100 further has a filter, and the filter is arranged at the outer housing 103.

According to an example of the present application, the respirator 100 is configured to be an electric supplied-air respirator or a face mask.

The present application relates to a respirator 100. The respirator 100 has an outer housing 103, a filter, and an end cover 104. The filter is arranged on the outer housing 103. Position-limiting devices matching each other are respectively provided on the end cover 104 and the outer housing 103, and are used for fixing the filter at the outer housing 103.

According to an example of the present application, the position-limiting device on the outer housing 103 includes a rod 105. The rod 105 is fixed at the filter. A plurality of ribs 1051 are formed in a longitudinal direction of the rod 105 and provided on an outer peripheral edge of the rod. The position-limiting devices on the end cover 104 are recesses 1041. An end of the rib 1051 engages with the recess 1041.

According to an example of the present application, the ribs 1051 are evenly distributed on the outer peripheral edge of the rod 105.

According to an example of the present application, an opening 1042 is provided in a middle portion of the end cover 104, and the recesses 1041 are provided on the outer periphery of the opening 1042.

According to an example of the present application, a through hole 3 is provided in the middle of the filter, and the rod 105 passes through the through hole 3.

According to an example of the present application, the respirator 100 further has a threaded fastener 106 having an unthreaded segment and a threaded segment. An aperture 1052 is provided in the middle of the rod 105. The opening 1042 is provided with an inner thread. The threaded fastener 106 is inserted into the aperture 1052 by means of the unthreaded segment thereof, and engages with the inner thread by means of the threaded segment thereof.

According to an example of the present application, the rod 105 is configured to retain the filter medium 1 of the filter.

According to an example of the present application, the end cover 104 is configured to be in the shape of a curved disc.

According to an example of the present application, the filter is configured to be an inhalation filter 10.

According to an example of the present application, the outer housing 103 has a recessed portion that is recessed relative to an outside surface thereof, and the inhalation filter 10 is accommodated in the recessed portion.

Figure 2:
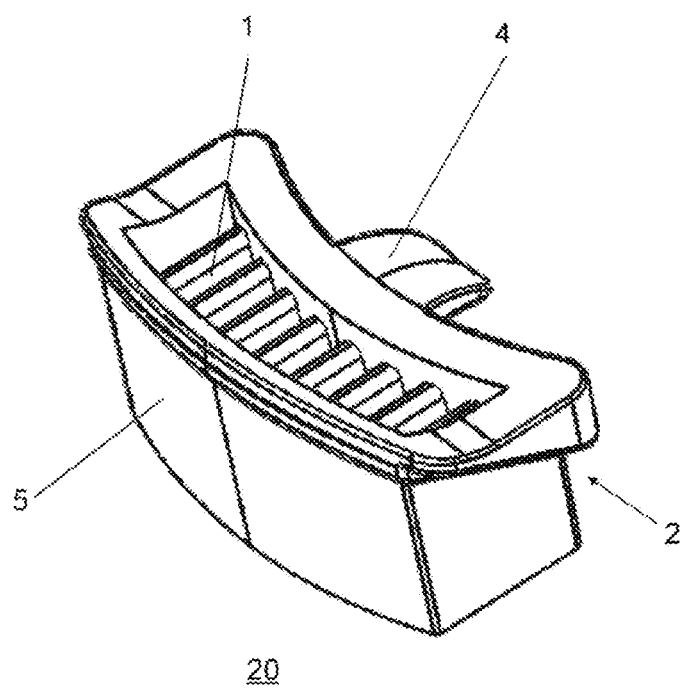
FIG. 2 shows a schematic diagram of an exhalation filter according to the present invention.

Referring to FIG. 1 and FIG. 2, FIG. 1 shows a schematic diagram of an inhalation filter 10 according to the present invention, and FIG. 2 shows a schematic diagram of an exhalation filter 20 according to the present invention.

A filter medium 1 can be seen in the drawings. The filter medium 1 is used in the filter of the respirator 100, and the filter medium 1 has a pleated structure.

It should be appreciated that the pleated structure refers to a structure provided with pleats or wrinkles, and may be formed by, for example, providing a winding, sinuous, or uneven curved portion or bent portion on an originally flat material. As can be seen, design of the pleated structure can greatly increase an effective filtration area of the filter medium 1, thereby increasing overall filtration efficiency of the respirator. Further, the pleated structure can provide improved support for supporting, for example, the surrounding housing, so that the overall shape of the filter is stable. This effect cannot be achieved by a flat filter medium. Additionally, applying the filter medium 1 to the respirator 100 improves a filtration effect of the respirator 100. This is different from a face mask and an orinasal mask employing a flat filter medium and an air purifier employing a pleated filter medium on the market.

The filter medium 1 can be configured to be filter paper, thereby facilitating purchase and/or reducing economic and time costs of manufacturing. The filter medium 1 may also be made of a HEPA material. HEPA is a high-efficiency low-resistance material, and is a known material. The HEPA material can effectively filter PM2.5 particulate matter from air, and is an effective filter medium for pollutants such as smoke, dust, and bacteria. HEPA may specifically be PP filter paper, fiberglass, composite PP PET filter paper, a melt-blown non-woven polyester fabric, melt-blown fiberglass, offset paper, an aluminum membrane, etc. Filtration grades include: H11 to H14, U15, and U16 (EN 1822). Employing the HEPA material achieves high-efficiency filtration, thereby achieving a high protection level. In addition, low resistance (namely low resistance to inhalation and breathing) allows for great respiratory comfort, and extends a battery life for electric/powered respirators.

In addition, in order to further improve performance and the protection level of the filter medium 1 (such as the filter medium for the inhalation filter 10), the filter medium 1 can also be made by combining an antibacterial and antiviral material and/or an activated carbon fabric material with the HEPA material. The antibacterial and antiviral material can be treated with organic and inorganic antibacterial agents so as to improve bacteriostatic and bactericidal performance. The activated carbon fabric material is an optional material for providing an odor removal or deodorization function. For example, activated carbon can be an activated carbon cloth provided with granular activated carbon (GAC) and activated carbon fiber (ACF).

Figure 10:
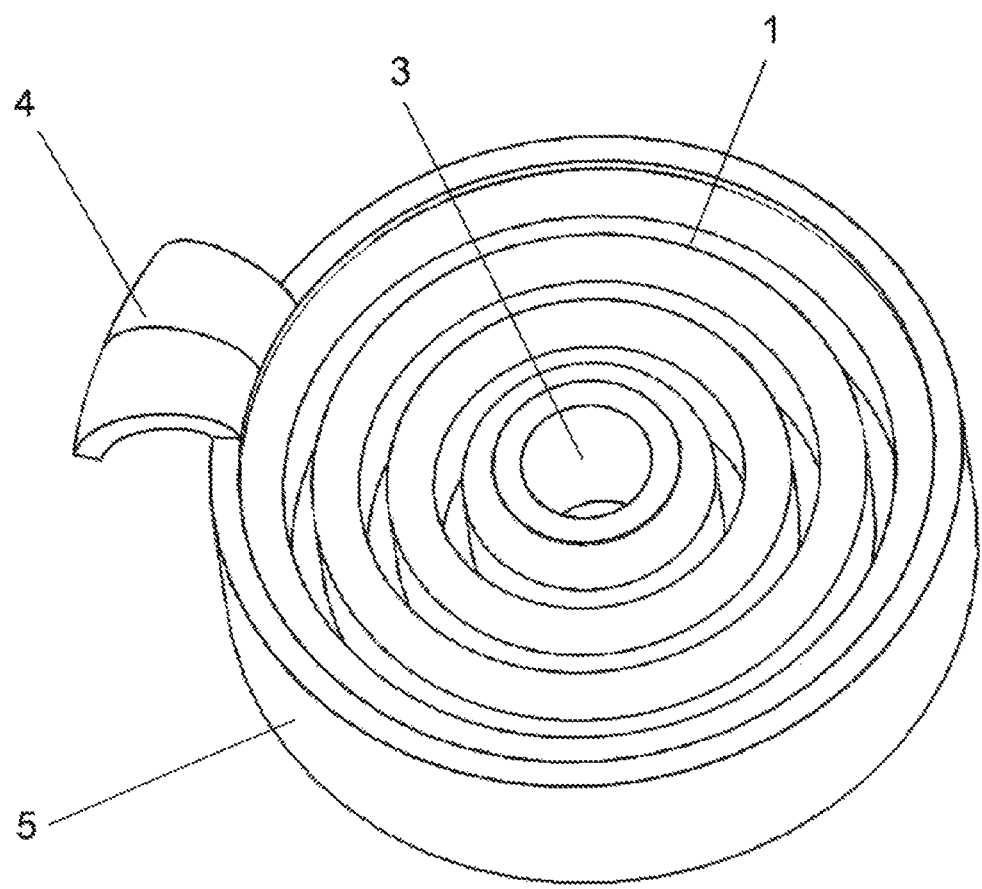
FIG. 10 shows a schematic diagram of another inhalation filter according to the present invention.
Figure 11:
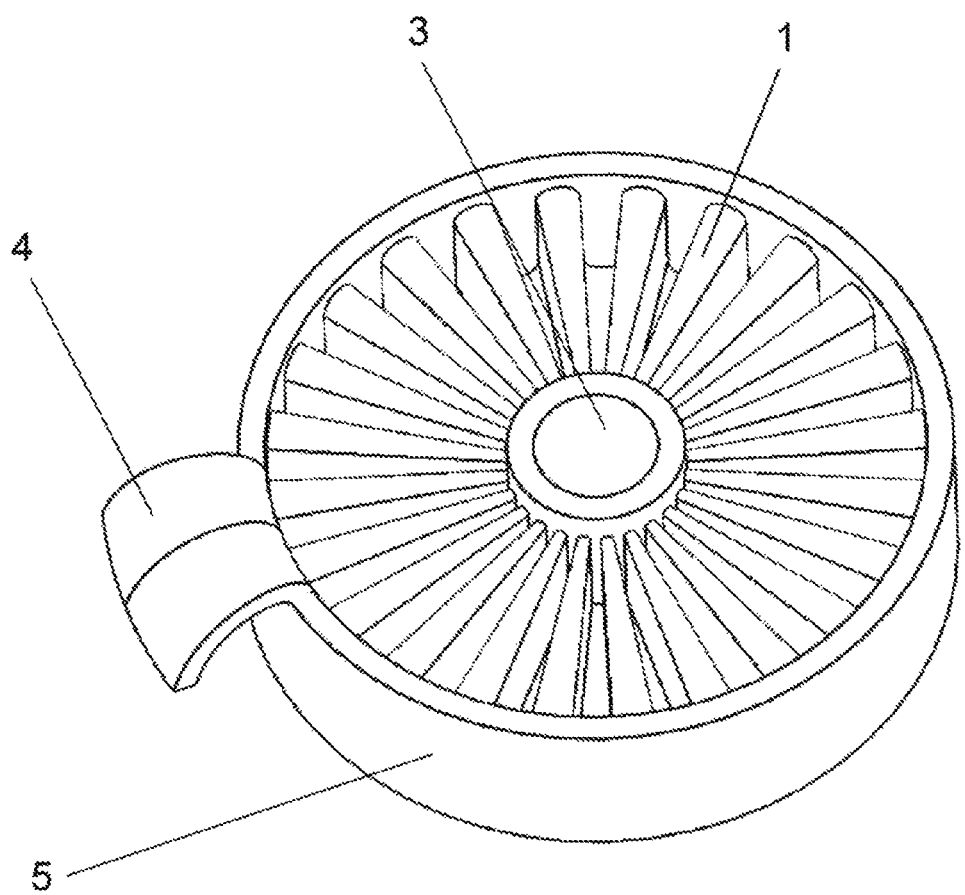
FIG. 11 shows a schematic diagram of still another inhalation filter according to the present invention.

Regarding specific configurations of the pleated structure, the pleated structure is, for example, a parallel structure, a radial structure, or a concentric circular ring structure. The concentric circular ring structure can also be seen in FIG. 10 (FIG. 10 shows a schematic diagram of another inhalation filter according to the present invention), and the radial structure can also be seen in FIG. 11 (FIG. 11 shows a schematic diagram of still another inhalation filter according to the present invention). Specifically, the pleated structure is configured to be shown as the parallel structure, the radial structure, or the concentric circular ring structure when viewed in the cross section of the filter medium 1. The cross section herein refers to a cross section taken in a radial direction of the filter. These three structures are all economical. The parallel structure can be obviously seen in FIG. 1 and FIG. 2, and the radial structure can also be referred to as a fan-shaped structure. In addition to having large filtration areas and being economical, these structures provide good support, are aesthetically pleasing, and have low breathing resistance. It should be appreciated that the filter as a whole has a filtration surface F. A filtration direction is perpendicular to the filtration surface F. Respiratory gas passes through the filter in the filtration direction. The filtration direction can be understood as a top view direction of the filter held horizontally. For example, if the filter is configured to be a cylinder, then the filtration direction is an axial direction, and the filtration surface is a disc surface.

The present invention also relates to a filter. The filter has any one of the aforementioned filter media 1. Therefore, the filter has features and characteristics corresponding to the filter medium 1, which will not be described herein again.

The filter can be configured to be an inhalation filter 10 and/or an exhalation filter 20. Providing inhalation filters and exhalation filters separately has the following benefit: the respirator 100 may employ filters having different structural features and different numbers of filters to perform inhalation filtration and exhalation filtration respectively, so that filter design is directed in consideration of differences between inhalation features and exhalation features. For example, as shown in the drawings, the inhalation filter 10 is configured to be a cylinder, because the inhalation filter 10 (together with a cover for covering the same) is visible to other individuals when in use, and is aesthetically pleasing when designed to be a cylinder. The exhalation filter 20 is generally provided inside the respirator 100, and is therefore invisible to other individuals when in use. Therefore, the exhalation filter 20 can be designed to be, for example, a curved cube, and this differs from conventional rectangular design so as to reduce a footprint. In addition, uniform curvature and shape design achieves an aesthetic effect. It should be appreciated that, in order to be applicable to respirators of different types or shapes, the shape of the filter can be modified freely.

It should be noted that, the cylinder, the cube, or other shapes referred to herein do not necessarily correspond to a cylinder, a cube, and the like in a mathematical sense, and certain errors, tolerances, and modifications to details are allowed, as long as the overall shape is substantially a cylinder or a cube. Therefore, for example, the inhalation filter 10 having an outer peripheral slope on the housing can still be a cylinder, and the curved exhalation filter 20 having a step 2 can still be regarded as a cube.

In order to ensure and enhance a sealing effect between the filter and the respirator 100, the present invention employs a plurality of methods. For example, a ramp and/or step 2 is provided on the filter (for example, on a side wall thereof) to form a seal between the filter and the respirator 100. The step 2 is exemplarily provided on an outer side of the housing 5 of the exhalation filter 20, and the ramp is exemplarily provided on an outer side of the housing 5 of the inhalation filter 10 (if the inhalation filter 10 is configured to be a cylinder, then the ramp can be embodied directly as a slope of the outer periphery of the cylinder). Certainly, objects and positions where the ramp and the step 2 are provided are not limited to examples shown in the drawings, and these sealing means can also be used on the individual filters in combination. Further, in an embodiment shown in the drawings, design of the ramp can specifically achieve an axial sealing effect between the inhalation filter 10 and the respirator 100, and design of the step 2 can specifically achieve an axial sealing effect between the exhalation filter 20 and the respirator 100. Additionally, the ramp and step also have aesthetic effects. Vertical and unified shape design employed in the prior art achieves poor adaptability to a respirator and poor use experience.

In another example, the filter has the housing 5 for accommodating the filter medium 1, and the housing 5 is made of a TPE material. TPE refers to a thermoplastic elastomer, and is also referred to as artificial rubber or synthetic rubber. A product thereof has exceptional properties of conventional crosslinked vulcanized rubber such as being highly elastic, anti-aging, and oil resistant, has features of conventional crosslinked vulcanized rubber such as being environmentally-friendly, being non-toxic, providing a comfortable hand feel, being aesthetically pleasing, and so on, and has features of ordinary plastic such as being easy to machine and adapted to a wide range of machining methods. Production can be performed by means of methods such as injection molding, extrusion, blow molding, and the like, thereby simplifying a machining process and reducing machining costs. Common thermoplastic elastomers include styrene-based TPE, olefine-based TPE, diene-based TPE, vinyl chloride-based TPE, and polyurethane-based TPE.

It can thus be seen that the sealing effect between the filter and the respirator 100 can be improved due to high elasticity of the TPE material. Further, in an embodiment shown in the drawings, specifically, the axial sealing effect between the inhalation filter 10 and the respirator 100 and the axial sealing effect between the exhalation filter 20 and the respirator 100 can be respectively achieved. Further, the filter is designed and manufactured by using a TPE material having sufficient hardness and a TPE manufacturing process (such as injection molding), so as to provide a good appearance and a good sealing effect. A good sealing effect can provide a high protection level, and reduce leakage of respiratory gas.

In order to facilitate assembly with the respirator 100, a through hole 3 is provided on the filter (for example, in the middle thereof), and exemplarily, the through hole 3 is correspondingly provided on the inhalation filter 10. Correspondingly, the respirator 100 can be provided with a pin, and the pin is inserted into the through hole 3 during assembly, so as to complete assembly and fixation. The exhalation filter 20 is mounted inside the respirator 100 by means of engagement. Certainly, a variety of other assembly methods can be used to mount the filter. Design of the through hole 3 facilitates assembly and removal of the filter 10, and enables the filter to match the cover for covering the filter. Design without a through hole in the prior art results in poor use experience, and design for fixing a cover for covering a filter is complex.

In contrast to the assembly described above, in order to facilitate removal of the filter from the respirator 100, a handle 4 can be provided on the filter. The handle 4 can be configured to be on an outer side of the housing 5 and to extend outwards from the housing 5, or can be configured to be in an inward region of the housing 5, as long as a user can operate (for example, holding or pushing) the handle to complete an action of removing the corresponding filter. It is particularly seen in FIG. 1 that the handle 4 of the inhalation filter 10 is provided on the outer periphery of the through hole 3. Because a gap is present in the pleated structure, a user can push the handle 4 from the gap by a finger, so as to complete removal of the inhalation filter 10. The position of the handle 4 facilitates hiding of the handle 4, thereby achieving an aesthetic effect. The handle 4 can certainly also be configured to be on the outer side of the housing 5, so that a user can easily grip the handle 4 directly from the outside. This design certainly does not affect the sealing effect between the filter and the respirator. The handle design facilitating removal is not present in the prior art, and user experience is therefore not good enough.

Figure 3:
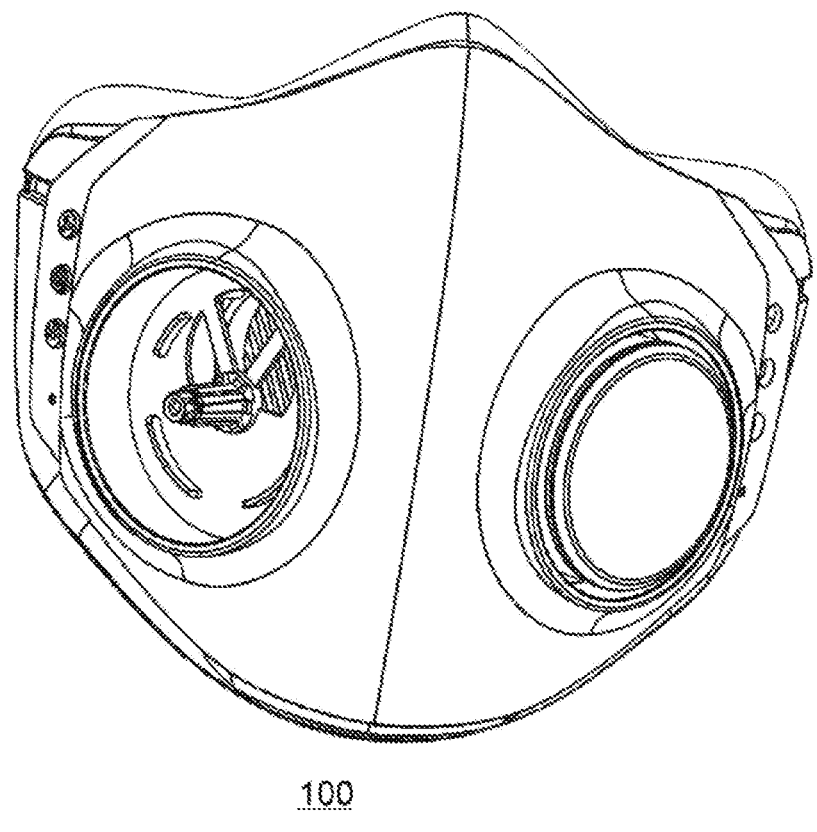
FIG. 3 shows a schematic diagram of a respirator according to the present invention.

Referring to FIG. 3, FIG. 3 shows a schematic diagram of a respirator 100 according to the present invention.

The respirator 100 has any one of the aforementioned filters, and therefore also has features and characteristics brought about by the filter. The filter of the present invention is applicable to a variety of respirators 100, and therefore can be configured to have various adaptive shapes, such as a cylinder and a curved cube shown in the drawings. A specific shape can be determined according to a specific mounting position and/or aesthetic and spatial requirements of a respirator to which the filter is applied.

For example, the respirator 100 is configured to be an electric supplied-air respirator or a face mask. It should be appreciated that, the electric supplied-air respirator refers to a respirator using a fan driven by power provided by a battery to assist a user in breathing, typically assists the user in inspiration, and therefore can be considered to be an active respirator. The face mask is a passive respirator.

As described above, the filter is mounted in a housing of the respirator 100 in a radially and axially sealed manner. Radial sealing can be achieved by means of, for example, the housing 5 made of TPE. Axial sealing can be achieved by means of, for example, the ramp or step 2. Optionally, the filter is mounted in and radially interferes with the housing of the respirator 100, which may also be achieved by means of high elasticity of TPE. Design of radial interference improves a radial sealing effect between the filter and the respirator. A specific dimension of the radial interference can be, for example, 0.4 mm.

The respirator 100 has a facepiece. One or more inhalation filters 10 including the filter are arranged at the facepiece, and one or more exhalation filters 20 including the filter may also be arranged at the facepiece. It can be seen obviously from FIG. 3 that the respirator 100 has a facepiece provided with one exhalation filter 20 including the filter and two inhalation filters 10 including the filter. The exhalation filter 20 is arranged in the middle of a lower portion (for example, on an inner side) of the facepiece at the mouth position of a user, and the inhalation filters 10 are arranged on two sides (for example, on an outer side) of the facepiece and above the exhalation filter 20 in a vertical direction. This design takes into account the aesthetic effect. In addition, using two inhalation filters 10 can halve inhalation resistance, and using the exhalation filter 20 can prevent a user having been infected with virus from spreading the virus to the outside. Therefore, this bidirectional protection achieves better safety than an orinasal mask or a face mask having breather valve design on the market (the breather valve cannot prevent an infected wearer from spreading virus or bacteria to the outside). The positions, shapes, and numbers of the exhalation filters 20 and the inhalation filters 10 may be modified according to actual circumstances.

In order to manufacture the filter of the present invention, the present invention provides a novel method. The method includes the following steps of:
  pleating the filter medium 1 to form the pleated structure;
  shaping the pleated filter medium 1; and
  forming the housing 5 of the filter on the shaped filter medium 1 so as to accommodate the filter medium 1.

In each conventional manufacturing process of a filter: a housing of the filter is manufactured first, or the housing is prepared separately; then, a filter medium is shaped and then mounted in the housing, thereby completing manufacture of the filter. This method needs involvement of a glue, and therefore affects performance of the filter. However, in the method of the present invention, the filter medium is manufactured first, and then manufacture of the housing is completed on the basis of the filter medium. This manufacturing method is advantageous in that involvement of a glue is not required, thereby achieving better quality and allowing for more shape designs.

Specifically, the shaping step can be performed by means of cutting or punching, and/or the step of forming the housing 5 is performed by means of surrounding injection-molding. A manufacturing process of cutting or punching does not affect the pleated structure of the filter medium. The surrounding injection-molding refers to injection-molding the housing 5 in a manner of surrounding the filter medium 1. Further, the pleat height and pleat pitch of the pleated structure of the filter medium can be optimized for a largest breathing region, so as to achieve lower breathing resistance. In addition, properties (including the thickness and hardness) of the TPE housing (particularly an outer housing) can also be determined empirically or experimentally to achieve a better sealing effect and good appearance.

It should be particularly mentioned that, if the pleated structure is configured to be shown as a parallel structure when viewed in the cross section of the filter and the filter is configured to be a cylinder (for example, a shape shown in FIG. 1), then formation of the housing 5 is performed by forming the housing 5 in the shape of an ellipse around the shaped filter medium 1. A major axis direction of the ellipse is perpendicular to an extension direction of the parallel structure, and a minor axis direction of the ellipse is consistent with the extension direction of the parallel structure. This manufacturing manner takes into account the fact that stress distribution of the parallel structures is not uniform. That is, the parallel structure has a tendency of deformation of stretching in the extension direction thereof due to stress, and has a tendency of deformation of contracting in a perpendicular direction. Therefore, forming the aforementioned housing 5 in the shape of the ellipse can compensate for or cancel out such tendencies, thereby causing the completed filter to have extremely great roundness as a whole.

Figure 4:
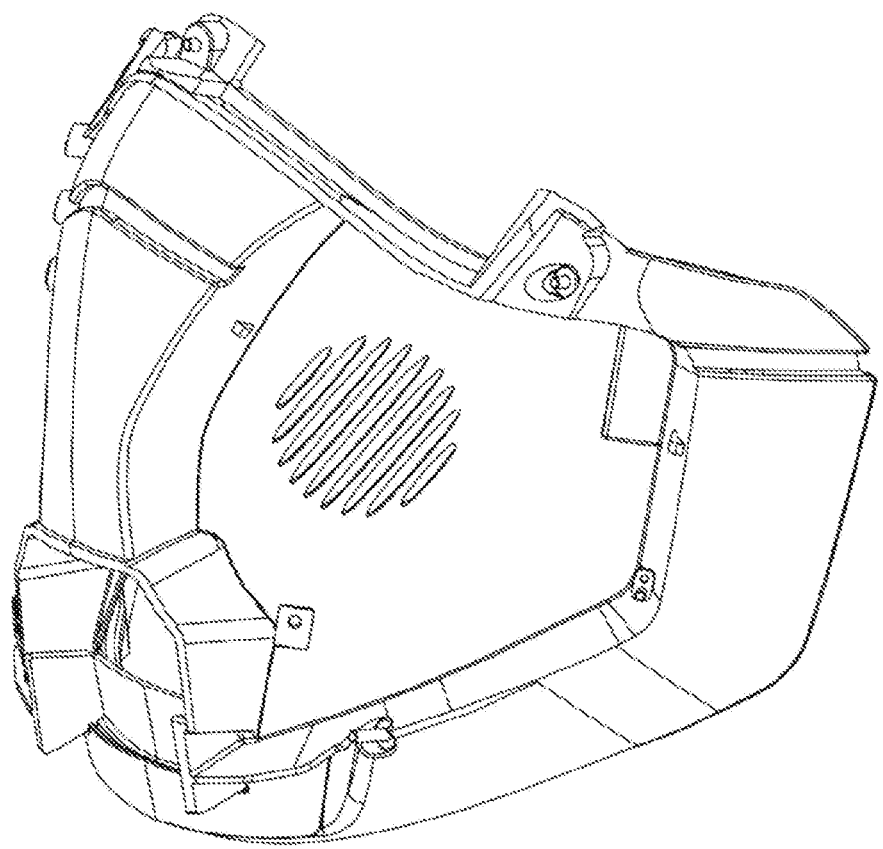
FIG. 4 shows a schematic diagram of a middle frame of a respirator according to the present invention.
Figure 5:
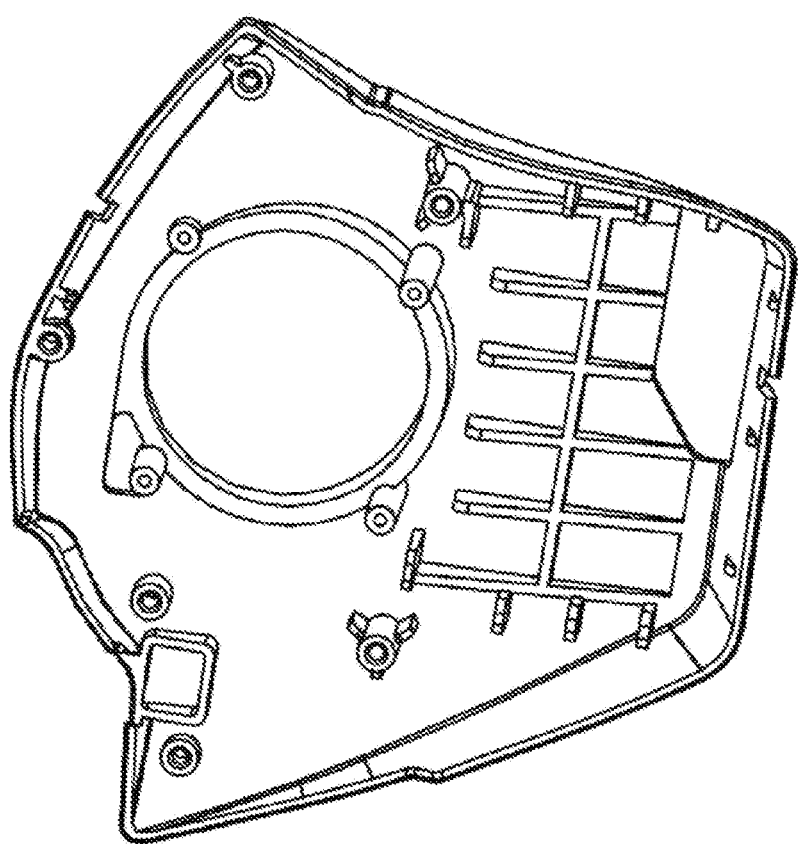
FIG. 5 shows a schematic diagram of an integrated board of a respirator according to the present invention.
Figure 6:
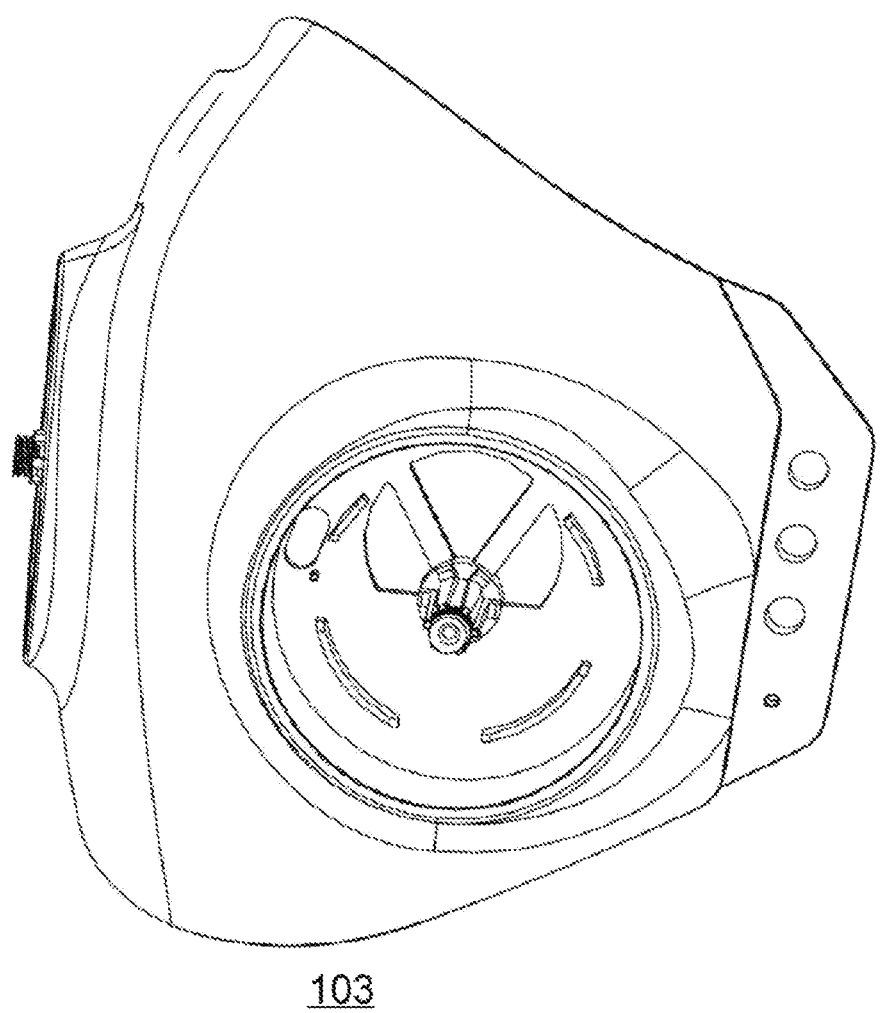
FIG. 6 shows a schematic diagram of an outer housing of a respirator according to the present invention.

Referring to FIG. 4 to FIG. 6, FIG. 4 to FIG. 6 respectively show schematic diagrams of a middle frame 101, an integrated board 102, and an outer housing 103 of a respirator 100 according to the present invention.

A respirator, such as a PAPR, is used for providing professional and fashionable protection against COVID-19. The respirator of the present application provides bidirectional protection, has a high protection level, low inhalation and exhalation resistance, great comfort, a high matching degree, and little leakage of facepiece design, and provides good use experience with mounting and removal.

A typical PAPR should include three main members including a middle frame (in the middle) provided with a blower fan, a battery, a PCB, a button, or another functional member 107/assembly, a facial seal 108 (on the face side) having a soft silicone ring for facial sealing, and an outer housing (located outside). Typically, the facial seal 108 forms a seal to the face of a user. However, when in use, part of the middle frame may also contact the face of the user, depending on a specific shape of the middle frame.

In order to provide mechanical properties, the middle frame is typically made of a hard material, such as PA/PP/ABS. PA is a polyamide, commonly known as nylon. PP is polypropylene. ABS is an acrylonitrile-butadiene-styrene copolymer.

However, a design scheme employing the prior art needs to be improved. For example, a hard material and structure cannot provide a wearer with a gentle wearing feel, and cannot provide good matching for different facial features of different wearers. Many functional members 107 are difficult to secure and assemble into a hard middle frame. "Hard contact" of the functional member 107 to the middle frame is prone to result in leakage at a joint.

In order to address or alleviate one or more of the aforementioned problems, the present application employs a plurality of novel technical means. As can be seen in the drawings, the respirator 100 of the present application includes a middle frame 101, an integrated board 102, and an outer housing 103 connected in sequence to one another. A functional member 107 is provided on the integrated board 102. Therefore, the functional member 107 is arranged by means of the additionally designed integrated board, which replaces the scheme in the prior art in which the functional member 107 is arranged by means of the middle frame, resulting in simple assembly.

The functional member 107 can be arranged in the integrated board 102, and therefore the integrated board 102 is correspondingly configured to be in the shape of a bowl. That is, an erect edge frame is provided at a peripheral edge. Similarly, the middle frame 101 can also be configured to be a frame having an accommodation portion. The integrated board 102 is assembled or inserted into the accommodation portion. The edge frame and an edge of the accommodation portion can be connected to each other by means of shape matching. It should be appreciated that, the shapes of the functional member 107, the integrated board 102, the middle frame 101, and the outer housing 103 can be designed according to actual circumstances. For example, the shape of the integrated board 102 is designed according to arrangement of the functional member 107 to be provided thereon (for example, a ribbed portion is provided at the bottom of the integrated board to fix a battery of the functional member 107). The shape of the middle frame 101 is designed according to the shape of the integrated board 102.

Further, according to the technical solution of the present application, the middle frame 101 can be formed by TPU. The meaning and features of TPU have been described in the foregoing, and will not be described herein again. Because the functional member 107 is configured to be borne by the integrated board 102, the middle frame 101 can be made of soft TPU, thereby improving wearing comfort and reducing risk of leakage. Certainly, the middle frame 101 still needs to have certain hardness. The hardness can be, for example, 115A for ensuring certain strength for assembly of the integrated board 102.

In contrast, in order to assemble the functional member 107, the integrated board 102 is made of a hard material. Therefore, it can be seen that the hard material is no longer in the middle frame as in the prior art, and is transferred to the integrated board 102, thereby resulting in the aforementioned advantage.

Figure 13:
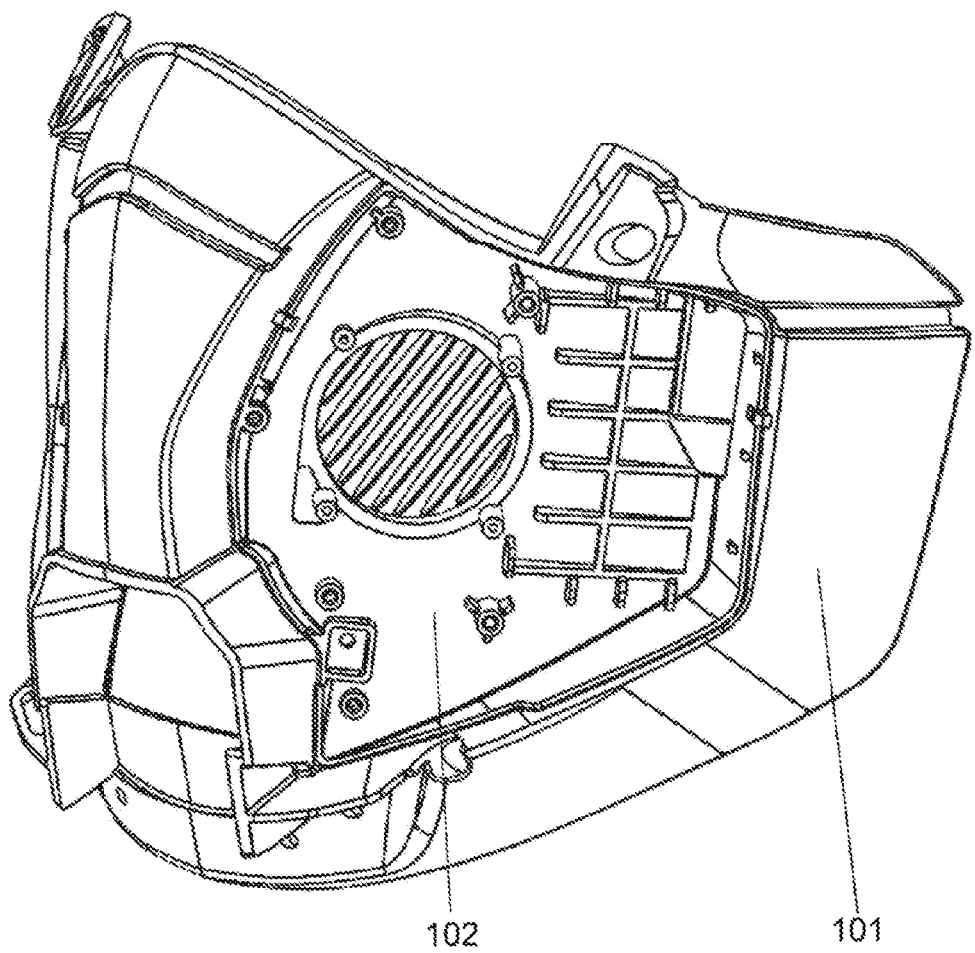
FIG. 13 shows a schematic diagram of a connection relationship between an integrated board and a middle frame according to the present invention.

Regarding a specific assembly method, reference can be made to FIG. 13 (FIG. 13 shows a schematic diagram of a connection relationship between an integrated board 102 and a middle frame 101 according to the present invention). Optionally, a connection between the integrated board 102 and the middle frame 101 is a tight connection, and for example, bonding is performed by means of a glue so as to improve tightness therebetween. The middle frame 101 is connected to the outer housing 103 by means of, for example, a screw. The integrated board 102 does not need to be directly connected to the outer housing 103. A tight connection can also be achieved by means of another method, such as the aforementioned shape matching method. In another example, the bottom of the integrated board 102 is provided with a hole and a rib. The rib is used for supporting the functional member 107 (such as a battery). The integrated board 102 is further provided with a plurality of mounting holes. Thus, the integrated board 102 can also be tightly connected to the middle frame 101 by means of the mounting holes thereof.

If the aforementioned material is adopted, then the soft middle frame 101 and the hard integrated board 102 are connected to each other by means of a glue, thereby achieving a soft-hard combination and therefore further improving the effect of preventing leakage of respiratory gas. Further, compared with conventional mechanical fastening, a bonded member has even stress distribution of internal stress transfer, high strength, and low costs, is lightweight, has less limitation on functions, and does not affect the overall appearance. Threaded fastening is a method for a removable fixed connection, and has advantages such as a simple structure, a reliable connection, easy removal, and the like. Threaded fastening includes, but is not limited to, bolt connection, screw connection, and fastener-assembly connection (such as an externally threaded fastener and a washer). Specific forms of a thread can be a triangular thread (common or inch), a cylindrical pipe thread, a rectangular thread, and the like.

Further, the respirator includes a facial seal 108 that is fit to and forms a seal to the face of a user when in use. The facial seal 108 is made of a material softer than the middle frame, such as silicone. The facial seal 108 is connected to the middle frame. The design of the softer facial seal 108 achieves more comfortable matching with the face of a wearer, and is flexibly adapted to different facial features of different wearers.

In sum, the respirator (such as the electric supplied-air respirator) of the present application has modular design that enables easy assembly, facial comfort resulted from the soft middle frame, adaptability to different facial seals 108 or faces resulted from the elastic material of the soft middle frame, and less leakage at the joint of mechanical members.

Figure 7:
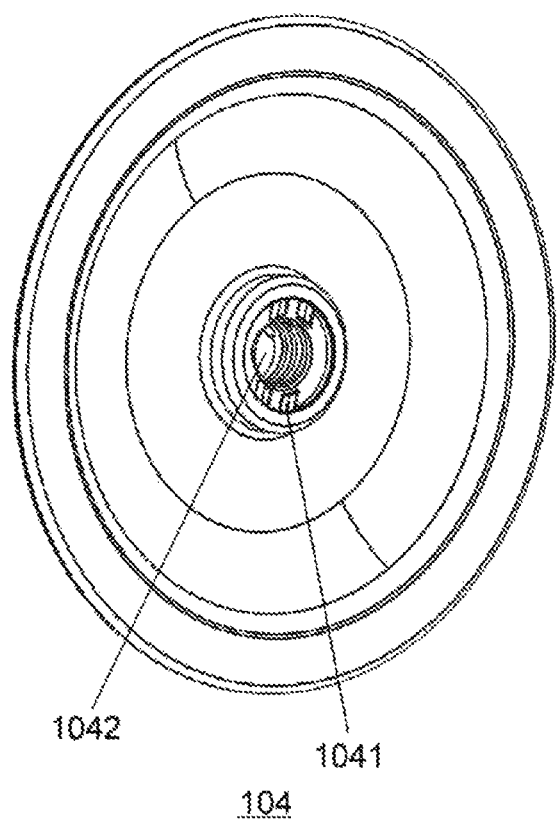
FIG. 7 shows a schematic diagram of an end cover of a respirator according to the present invention.

Referring to FIG. 7, FIG. 7 shows a schematic diagram of an end cover 104 of a respirator according to the present invention.

The end cover 104 is used for covering the filter, such as the inhalation filter 10, so as to protect the filter against interference from the outside. It should be appreciated that, a gap should be provided between the end cover 104 and the filter so as to allow a wearer to inhale. Therefore, the shape of the end cover 104 can be configured to be consistent with the shape of the filter medium to be protected, and can be configured to be, for example, circular.

The present application performs shape design for both the end cover 104 and the respirator 100. Specifically, the end cover 104 is configured as a whole to be in the shape of a curved disc, such that a good aesthetic effect is achieved, and furthermore, curvature provides a space for allowing for free design of other components. An opening 1042 is provided in a middle portion of the end cover 104. The opening 1042 can be specifically configured to be a through hole or a blind hole, and is a blind hole in this example. The opening is used for accommodating a threaded fastener 106 to be further described below.

In particular, in order to define the gap between the end cover 104 and the filter (such as the filter medium thereof), position-limiting devices used in cooperation with each other are provided on both the end cover 104 and the outer housing 103 of the present application, and are used for fixing the filter to the outer housing 103. By means of the position-limiting device, when the end cover 104 is mounted and moved towards the filter, the end cover 104 can be restricted so as to control the size of the gap.

Figure 8:
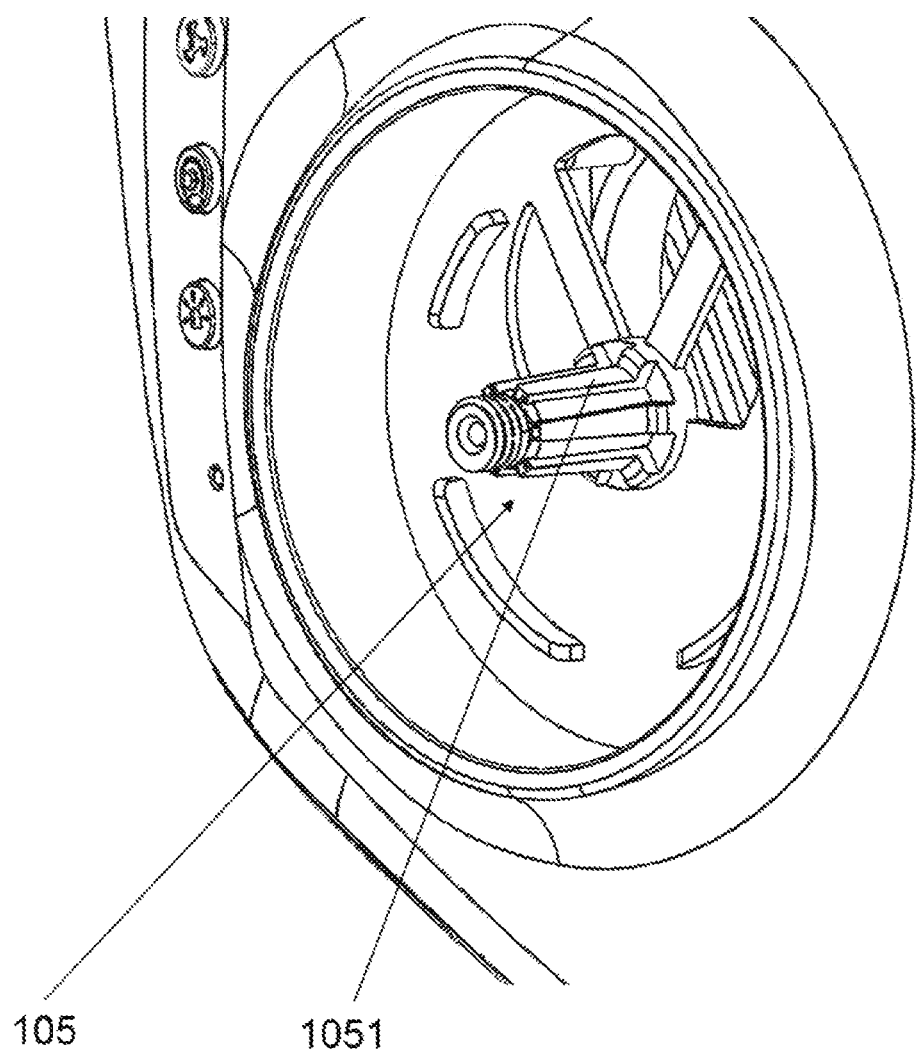
FIG. 8 shows a schematic partial view of an outer housing of a respirator according to the present invention.

Referring to FIG. 8, FIG. 8 shows a schematic partial view of an outer housing 103 of a respirator 100 according to the present invention.

Referring to both FIG. 7 and FIG. 8, exemplarily, recesses 1041 are provided in a middle portion of the end cover 104, for example on the outer periphery of the opening, and is used as a position-limiting device, and an rod 105 is provided on a portion located on the outer housing 103 and used to accommodate the filter (the portion is configured to be a recessed portion relative to an outer surface of the outer housing 103, and matches the shape of the filter), and is used as a position-limiting device. The rod 105 is fixed at the filter. Ribs 1051 are formed in a longitudinal direction of the rod 105 and provided around the outer periphery of the rod. Optionally, the ribs are distributed evenly. The rib 1051 matches the recess 1041 to function. That is, in a process of mounting the end cover 104 to the filter, one end of the rib 1051 can eventually be joined into the recess 1041, thereby completing position-limiting. Further, due to engagement-based mating between the rib 1051 and the recess 1041, completion of the joining can also generate an acoustic or tactile feedback, so as to inform mounting personnel in time that the end cover 104 has been mounted in a predetermined position, thereby preventing the filter from being damaged due to over tightness of mounting, and thus providing good use experience. Further, such engagement-based mating also has the effect of preventing the respirator from leaking.

Figure 9:
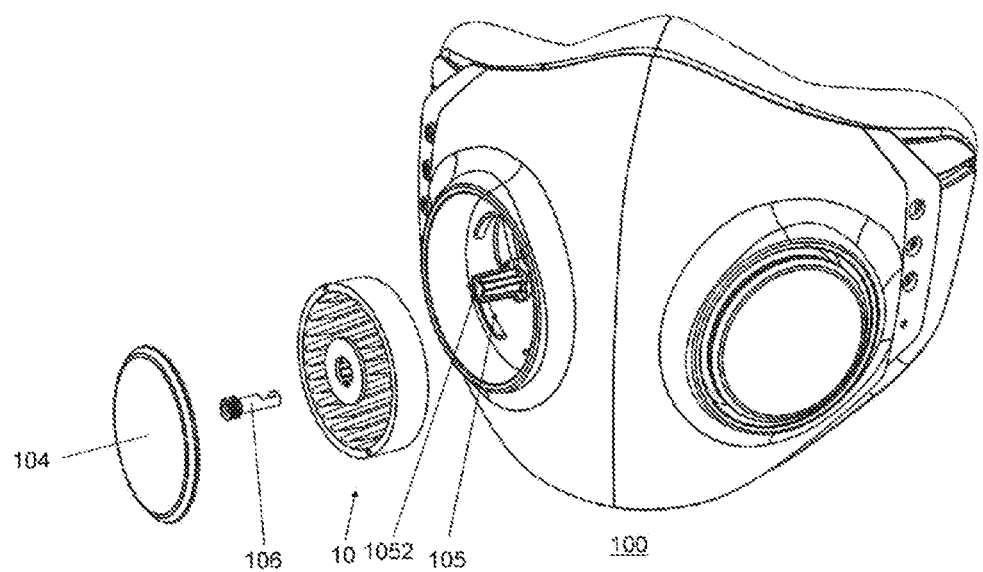
FIG. 9 shows an exploded view of a respirator according to the present invention.
Figure 12:
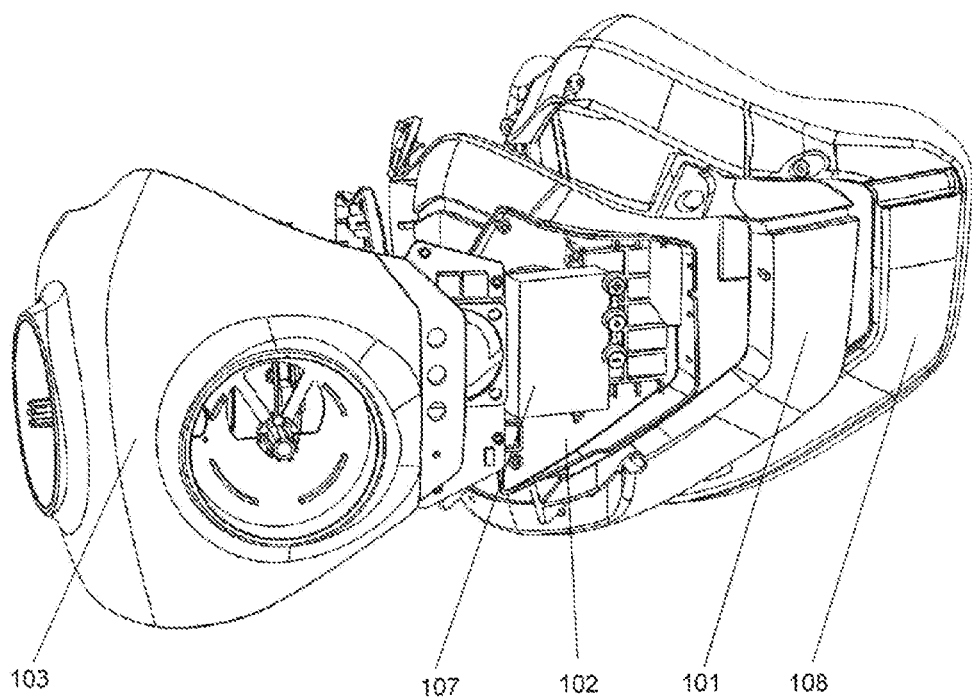
FIG. 12 shows an exploded view of a respirator according to the present invention.

Referring to FIG. 9 and FIG. 12, FIG. 9 and FIG. 12 each show an exploded view of a respirator 100 according to the present invention.

In order to complete the assembly of the end cover 104 and the respirator 100, it can be seen that an aperture 1052 is provided in the middle of the rod 105. The 1052 matches the threaded fastener 106, and the size of the through hole 3 of the filter is configured to be greater than the size of the rod 105 and the threaded fastener 106. Therefore, in an assembly process, the filter is assembled on the rod by means of the through hole 3, and is then accommodated in the recessed portion. Then, the threaded fastener 106 is inserted into the aperture 1052 by means of the unthreaded segment thereof via the through hole 3. Then, the end cover 104 is assembled on the threaded segment of the threaded fastener 106 by means of an opening 1042 thereof. In this regard, the opening 1042 can be provided with an inner thread matching the threaded segment, and therefore the end cover 104 can be mounted and fixed on the threaded segment by means of screwing. As mentioned in the foregoing, the ribs 1051 are joined to the recesses 1041, thereby completing assembly. After the assembly is completed, squeezing operation can also be performed so that the end cover 104 has interference with the threaded fastener 106, thereby further improving assembly and gas leakage prevention effects. The final gap can be made to, for example, 0.5-0.8 mm.

Further, the rod 105 can be configured to be slightly smaller than the through hole 3, so that when assembly is completed, the rod 105 has the function of retaining the filter and the filter medium 1 thereof, and prevents the same from deforming during assembly and use.

It should be appreciated that, other forms of assembly of the end cover 104 and the respirator 100 are also feasible, for example, performing mounting by means of direct shape matching between the filter and the recessed portion, completing fixation of the end cover 104 with a gap by means of engagement-based mating between the end cover 104 and the filter, and so on. In addition, the threaded fastener is a general term of a mechanical part having an inner thread or an outer thread, and is used as a fastener. Most common threaded fasteners are screws, nuts, and bolts. Other threaded fasteners, such as cage nuts, threaded inserts, threaded rods, and the like, are also available.

The assembly design ensures low-resistance and high-efficiency breathing, ensures a good sealing effect with respect to assembly, and ensures that no damage occurs between the filter medium and the corresponding connecting structure (such as the rod). Additionally, stop design of the end cover ensures a sufficient gas input area and a good frontal waterproof effect.

Therefore, the present application develops an innovative pleated filter medium, thereby allowing an air purifying respirator (PAPR/APR) product to achieve a high protection level, low inhalation and exhalation resistance, great comfort, good facepiece adaptability, easy use with respect to mounting and removal, and enabling a PAPR/APR respirator product to provide professional and fashionable protection against COVID-19. According to evaluation, performance of the filter medium meets design requirements. Filtration efficiency is 95%+, providing a good protection level. In addition, inhalation resistance of the filter medium is 70-80 Pa lower than inhalation resistance, 400 pa, of a current flat filter medium. A sealing effect has also been verified by means of assembly and testing. A good mating coefficient indicates that the filter medium has a better sealing effect on a PAPR apparatus. An actual wearing test also indicated that good user experience has been achieved, and the novel design facilitates mounting and removal.

It should be appreciated that, all of the above preferred embodiments are exemplary and non-limiting, and various modifications or variations made, on the basis of the concept of the present invention, to the specific embodiments described above should all fall within the scope of legal protection of the present invention.

What is claimed is:

1. A respirator, wherein the respirator comprises an outer housing, a filter, an end cover, the filter being arranged on the outer housing, and a plurality of position-limiting devices matching each other, wherein a position-limiting device of the plurality of position-limiting devices is provided on the end cover, wherein the other position-limiting device of the plurality of position-limiting devices is provided on the outer housing, wherein the plurality of position-limiting devices is used for fixing the filter at the outer housing, and wherein the position-limiting device on the outer housing comprises a rod, the rod being fixed at the filter, a plurality of ribs being formed in a longitudinal direction of the rod and provided on an outer peripheral edge of the rod, the position-limiting device on the end cover comprising recesses, and one end of the plurality of ribs engaging with the recesses.

2. The respirator according to claim 1, wherein the plurality of ribs is evenly distributed on the outer peripheral edge of the rod.

3. The respirator according to claim 1, wherein an opening is provided in a middle portion of the end cover, and the recesses are provided on an outer periphery of the opening.

4. The respirator according to claim 1, wherein a through hole is provided in a middle of the filter, and the rod passes through the through hole.

5. The respirator according to claim 1, wherein the respirator further has a threaded fastener having an unthreaded segment and a threaded segment, an aperture being provided in the middle of the rod, and an opening being provided with an inner thread, wherein the threaded fastener is inserted into the aperture by means of the unthreaded segment thereof, and engages with the inner thread by means of the threaded segment thereof.

6. The respirator according to claim 1, wherein the rod is configured to retain a filter medium of the filter.

7. The respirator according to claim 1, wherein the end cover is configured to be in a shape of a curved disc.

8. The respirator according to claim 1, wherein the filter is configured to be an inhalation filter.

9. The respirator according to claim 8, wherein the outer housing has a recessed portion that is recessed relative to an outside surface thereof, and the inhalation filter is accommodated in the recessed portion.

* * * * *